(12) United States Patent
Day et al.

(10) Patent No.: US 11,050,251 B2
(45) Date of Patent: *Jun. 29, 2021

(54) SUPPORTING ELECTRICAL UTILITY PERFORMANCE WITH DISPATHABLE DISTRIBUTED ENERGY RESOURCES

(71) Applicant: Negawatt Assets, LLC, McClellan, CA (US)

(72) Inventors: Michael Sean Day, Sacramento, CA (US); Calvin R. Wylie, McClellan, CA (US)

(73) Assignee: Negawatt Assets LLC, Rocklin, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/995,499

(22) Filed: Jun. 1, 2018

(65) Prior Publication Data

US 2019/0140446 A1 May 9, 2019

Related U.S. Application Data

(63) Continuation of application No. 14/870,389, filed on Sep. 30, 2015, now Pat. No. 9,997,914.

(60) Provisional application No. 62/096,423, filed on Dec. 23, 2014.

(51) Int. Cl.
H02J 3/14 (2006.01)
H02J 3/32 (2006.01)
H02J 3/38 (2006.01)
H02J 3/00 (2006.01)

(52) U.S. Cl.
CPC ............... *H02J 3/14* (2013.01); *H02J 3/32* (2013.01); *H02J 3/381* (2013.01); *H02J 3/003* (2020.01); *Y02B 70/3225* (2013.01); *Y04S 20/222* (2013.01)

(58) Field of Classification Search
CPC ...... H02J 3/14; H02J 3/32; H02J 3/381; H02J 2003/003; Y02B 70/3225; Y04S 10/54; Y04S 20/222
USPC .......................................................... 307/31
See application file for complete search history.

(56) References Cited

U.S. PATENT DOCUMENTS 9,997,914 B2 * 6/2018 Day ........................... H02J 3/14
2012/0029897 A1 * 2/2012 Cherian ..................... H02J 3/00
703/18

* cited by examiner

*Primary Examiner* — Carlos Amaya (57) ABSTRACT

Distributed energy resources are validated by dispatching a distributed energy resources individually in known ambient conditions and monitoring the particular effect of dispatch to then establish a database of performance for multiple different distributed energy resources. The distributed energy resources can be permanently monitored to further build up this database and to verify that the distributed energy resource 1s performing consistent with its validation or other expected performance. Distributed energy resources of a slow responding variety and a fast responding variety can be paired together and dispatched together, so that the paired fast responding and slow responding distributed energy resources mimic a large fast responding distributed energy resource. The benefits of a high capacity fast responding distributed energy resource is thus provided, such as for the load shedding and grid support benefits thereof.

23 Claims, 3 Drawing Sheets

SUPPORTING ELECTRICAL UTILITY PERFORMANCE WITH DISPATHABLE DISTRIBUTED ENERGY RESOURCES

CROSS-REFERENCE TO RELATED APPLICATIONS

This application claims priority to U.S. application Ser. No. 14/870,389 filed on Sep. 30, 2015 which claims priority to U.S. Provisional Application No. 62/096,423 filed on Dec. 23, 2014, the entirety of the disclosures of which are incorporated herein by reference.

FIELD OF THE INVENTION

The following invention relates to methods and systems for load shedding to maintain electric utility supply system ("grid") electric power. More particularly, this invention relates to systems for validation of the load shedding and other grid support characteristics of a distributed energy resource including whether the distributed energy resource is fast in response or slow in response when dispatched, and matching slow responding distributed energy resources with fast responding distributed energy resources for optimal grid support.

BACKGROUND OF THE INVENTION

The relatively low power losses associated with distribution of power through harnessing of electricity has enabled the transmission of electric power over large distances. The relative efficiency of large stationary power plants often results in great distances between major sources of electric power input and electric power use/output. The electric power transmission lines between such power generation sources and power users is typically regulated by a public utility which maintains this power supply system, also referred to as "the grid."

For the grid to function properly and supply electric power users with the power that they expect it is important that power input into the grid be at least as great as the demand for power outputted from the grid. Furthermore, it is important that voltage at various different locations within the grid be maintained and that the frequency of AC electric current within the grid also be properly maintained. An inefficient way to maintain the grid is to always have an excessive oversupply of electric power into the grid and merely discharge to ground the power that is not needed, so that users always have an abundant supply of electric power. However, such an approach is not optimal due to the significant waste of electric power involved, and the waste of resources utilized in generating such excess power. Rather it is beneficial that the grid maintain only a small margin between power generated and power used, and then that the grid be able to respond quickly to support function of the grid should supply drop unexpectedly (such as when a power plant has a failure event) or if demand increases abruptly (such as when demand is peaking for air conditioning in highly populated areas on a hot afternoon).

Less desirable solutions to this problem include having customers agree in advance to have their power interrupted should the supply and demand within the grid require "load shedding." As another option, "rolling blackouts" or "rolling brownouts" can be resorted to where different portions of the grid are shut down sequentially or allowed to drop below desired minimum voltage or otherwise partially fail to fully meet demand.

To avoid these less desirable solutions to the problem of mismatch between electric demand and electric supply, it is also known to provide dispatchable distributed energy resources. Such distributed energy resources can be equipment which supplies power to the grid or equipment which draws power from the grid. Such distributed energy resources benefit from being dispatchable in that control over the operation of the unit is at least partially surrendered to the electric utility operator. The electric utility operator can then "dispatch" the distributed energy resource when needed to provide another tool for the grid operator in adequately supporting operation of the grid.

Various problems with dispatchable distributed energy resources warrant further innovation and improvement. It can be difficult to quantify the effect that dispatching a particular distributed energy unit will have on the grid. In some instances the distributed energy resource may have a theoretical expected effect on the grid when dispatched, but the actual effect of dispatching the distributed energy resource might vary significantly from the expected effect. Thus, an electric utility relying on theoretical or predicted load shedding benefits from dispatching particular distributed energy resources might dispatch a series of such distributed energy resources and not receive the expected benefit, leaving the grid in a vulnerable operational state. Accordingly, a need exists for more comprehensive evaluation of the impacts of dispatching particular distributed energy units and resources in advance, so that the utility can rely more completely on the load shedding results and other grid support benefits to be provided by dispatching a particular distributed energy resource.

Another problem with dispatchable distributed energy resources is that the quantity of load shedding provided by distributed energy resource can vary over time. In many instances, when a distributed energy resource is first dispatched only a small amount of load shedding is provided. This amount of load shedding will increase over some time interval until the distributed energy resource is providing the full load shedding benefit to the grid. However, during this time lag, while the distributed energy resource is passing through a transient mode of operation, the full anticipated load shedding benefit is not received. In many instances a grid operator needs to be able to rely on a fast and predictable response to a situation, such as a large power plant going offline unexpectedly. If dispatchable distributed energy resources are slow responding, the grid is left in a vulnerable state during this transient period. Also, predictable load shedding allows the grid to support ancillary services, even in non-emergency situations, such as to support the continuous flow of electricity so that supply will continually meet demand.

Dispatchable distributed energy resources come in a variety of different types and styles, some of which are significantly more expensive than others. From an economic standpoint, it is desirable to first dispatch low cost distributed energy resources to optimize financial performance along with adequate grid performance. With the particular needs for improvement to dispatchable distributed energy resources as described above, this invention is presented to more effectively support electric utility performance with dispatchable distributed energy resources of various types and through more effective and permanent monitoring and validation of the load shedding characteristics and benefits of different distributed energy resources in real-world conditions.

SUMMARY OF THE INVENTION

With this invention, dispatchable distributed energy resources are managed in a manner increasing the beneficial support of electric utility grid performance over what has been heretofore possible. A first aspect of this invention is to more effectively and accurately validate the load shedding and other performance characteristics of a distributed energy resource. The performance of a distributed energy resource is often dependent upon ambient conditions such as temperature, relative humidity, time of day, time of year and other parameters. Furthermore, while one can theoretically evaluate the anticipated performance of a distributed energy resource, being able to actually measure the effect of dispatching of a distributed energy resource under different conditions goes beyond theory and prediction to full validation of the distributed energy resource.

With this invention each distributed energy resource is coupled to the grid and to electric power meters either directly on a distributed energy resource, or on an interconnection between the distributed energy resource and the grid, or potentially meters on the grid itself. A testing and validation process is followed to validate the distributed energy resource.

In particular, the distributed energy resource 1s dispatched at a time when surrounding real-world conditions that might have an impact on the performance of the distributed energy resource are also known and measured. After the distributed energy resource is dispatched, meter readings from before dispatch and after dispatch are compared to identify the actual performance achieved by dispatching the distributed energy resource. This performance metric, such as an amount of kilowatts of load shed, is stored within a database along with various different ambient condition parameters which were in existence when the performance was measured.

By performing further validation by dispatching of the distributed energy resource under different ambient conditions and tracking those ambient conditions as well as the performance of the distributed energy resource, a database is built up for that distributed energy resource which is highly likely to accurately predict (within a small error range) the performance to be expected from dispatching of the distributed energy resource. This database can further be augmented to include similar data for other distributed energy resources. A grid operator thus can have a high degree of confidence that when a particular distributed energy resource is dispatched that a particular performance will be achieved.

In addition to such validation of the distributed energy resource, another aspect of this invention is to provide for permanent monitoring of the distributed energy resource. In particular, meters on the distributed energy resource between the distributed energy resource and the grid can take electric power and other measurements before and during dispatch of the distributed energy resource. This actual monitoring of the performance of the distributed energy resource can also be supplied to the grid operator to ensure that distributed energy resources are performing as expected or to take further action if a distributed energy resource is for some reason not performing as expected. With a combination of permanent monitoring and detailed validation, rather than relying on theoretical performance, a grid operator can dispatch distributed energy resources while managing the electric grid in a highly reliable fashion.

Such monitoring can take place for validation by the grid operator in one embodiment by utilizing what is generally referred to as advanced metering infrastructure. With advance metering infrastructure an electric power meter goes beyond merely summing all of the power utilized over time to produce a product of power and time to establish energy usage (e.g. in kilowatt hours), but also tracks power usage for individual increments of time. For instance, the meter might sum all of the power utilized over a small increment of time. For many such meters the amount of time is in fifteen minute increments. Thus, an amount of energy (e.g. in kilowatt hours) for each fifteen minute increment is determined. By multiplying this amount of kilowatt hours of energy sensed by the meter by 4.0 one can determine an average rate of energy usage in kilowatt hours during that fifteen minute period.

Advanced metering infrastructure also includes telecommunications capability so that at the end of each fifteen minute increment power usage information can be transmitted to various individuals or systems, including the user of the power and the electric utility and the grid operator. The grid operator can utilize such information, even though not particularly precise (in that it is only gathered every fifteen minutes), as a real-time validation tool to validate whether or not a dispatchable resource is functioning as predicted.

In particular, the grid operator can monitor the electric power utilized by a distributed energy resource in fifteen minute increments and observe how this power utilization is changing over time in the form of a power utilization curve. During periods of normal operation of the grid the grid operator can dispatch the resource, such as by selecting the resource for shifting into a load shedding mode. Preferably, this dispatch occurs close to the beginning of a fifteen minute meter reading instant. Fifteen minutes later when the next meter reading comes to the grid operator from the resource that was dispatched, the grid operator can observe the new power utilization amount. By studying a difference between the actual power utilization measured and the power utilization that was measured fifteen minutes earlier (or a predicted amount of energy utilization for that meter by observing the power utilization curve therefore), an amount of load shedding by the resource is "validated." The grid operator has relatively high confidence that in a situation where the grid is coming under stress and load shedding is required, that the particular validated resource can be dispatched and the expected load shedding will actually occur.

After the first fifteen minute increment and the first measurement, the grid operator can wait another fifteen minutes and observe the next power utilization reading from the resource and compare that measurement with the previous measurement to see if the load shedding of the resource increases even more after the first fifteen minutes, if it remains steady, or if the load shedding ability of the resource tends to taper off over time. Numerous sequential measurements can be taken so that the load shedding capability of the resource can be more fully understood, documented and relied upon by the grid operator. When desired information has been fully gathered, the grid operator can cancel the dispatch order and return the resource to standard operation. Such validation tests would be performed typically in a random periodic basis to re-certify dispatchable energy resources m an ongomg manner.

As a further aspect of this invention, the performance of distributed energy resources can be evaluated with regard to the response time of the distributed energy resource. Distributed energy resources are identified as being relatively slow responding or relatively fast responding. Fast responding distributed energy resources are then paired with slow responding distributed energy resources and are at least partially dispatched together. By such combined dispatching, ultimate load shedding and other grid performance benefits can be provided in a fast response manner without requiring all of the dispatched energy resources to be of a fast responding variety.

By such pairing, all of the benefits of a fast responding distributed energy resource are provided while only encountering a portion of the typically higher cost associated with dispatching a fast responding distributed energy resource. In one embodiment, the response curve of a slow responding distributed energy resource is measured over time. The fast responding distributed energy resource has a variable response which is selected to match this response curve of the slow responding distributed energy resource so that the paired fast responding and slow responding distributed energy resource, when dispatched together, match closely the effect of a fast responding distributed energy resource without utilizing any more of the fast responding distributed energy resource than required.

In one embodiment the fast responding distributed energy resource includes a battery and the slow responding distributed energy resource includes a relatively low cost and high load shedding distributed energy resource such as an evaporative pre-cooler. A gap over time between the ultimate load shedding of the slow responding distributed energy resource and the actual load shedding of the slow responding distributed energy resource before it reaches its maximum load shedding capability is compensated for by variably supplying electric power from the battery or other fast responding distributed energy resource. In this way the full benefit of the slow responding distributed energy resource is provided immediately by dispatching the paired fast responding and slow responding distributed energy resources together.

OBJECTS OF THE INVENTION

Accordingly, a primary object of the present invention is to provide a method for verifying distributed energy resource performance for more accurate electric power supply management.

Another object of the present invention is to enhance a reliability of the electric power grid with minimum cost and minimum waste of power generation resources.

Another object of the present invention is to provide a distributed energy resource dispatching system which goes beyond prediction of benefits associated with dispatching of a distributed energy resource to actual permanent monitoring of the performance of the distributed energy resource.

Another object of the present invention is to provide a method for allowing a slow responding distributed energy resource to function as a fast responding distributed energy resource without the expense of an asset composed entirely of a fast responding distributed energy resource.

Another object of the present invention is to enhance the reliability of the electric power grid without requiring additional baseline power resources or more expensive distributed energy resources.

Another object of the present invention is to provide systems to allow owners of distributed energy resources to maximize the benefits provided to such distributed energy resource operators when they are called upon by a grid operator to shed load or otherwise alter performance to support grid operation.

Another object of the present invention is to provide a system to allow a grid operator to reliably operate the grid by dispatching distributed energy resources in a fashion which is verified and reliably sheds load when required by the grid operator.

Other further objects of the present invention will become apparent from a careful reading of the included drawing figures, the claims and detailed description of the invention.

DESCRIPTION OF THE PREFERRED EMBODIMENT

Referring to the drawings, wherein like reference numerals represent like parts throughout the various drawing figures, reference numeral 10 (FIG. 1) is directed to a system which facilitates permanent monitoring and validation of distributed energy resources and also facilitates pairing of fast and slow responding distributed energy resources. Validation of the distributed energy resources allows a grid operator to have confidence that in a particular situation a distributed energy resource will shed load or otherwise perform in an expected manner when dispatched. By permanently monitoring distributed energy resource performance, verification of the expected performance of the distributed energy resource can also occur. By pairing fast responding distributed energy resources with slow responding distributed energy resources, the benefits of a fast responding distributed energy resource are provided along with the low cost benefits of a slow responding distributed energy resource.

Figure 1:
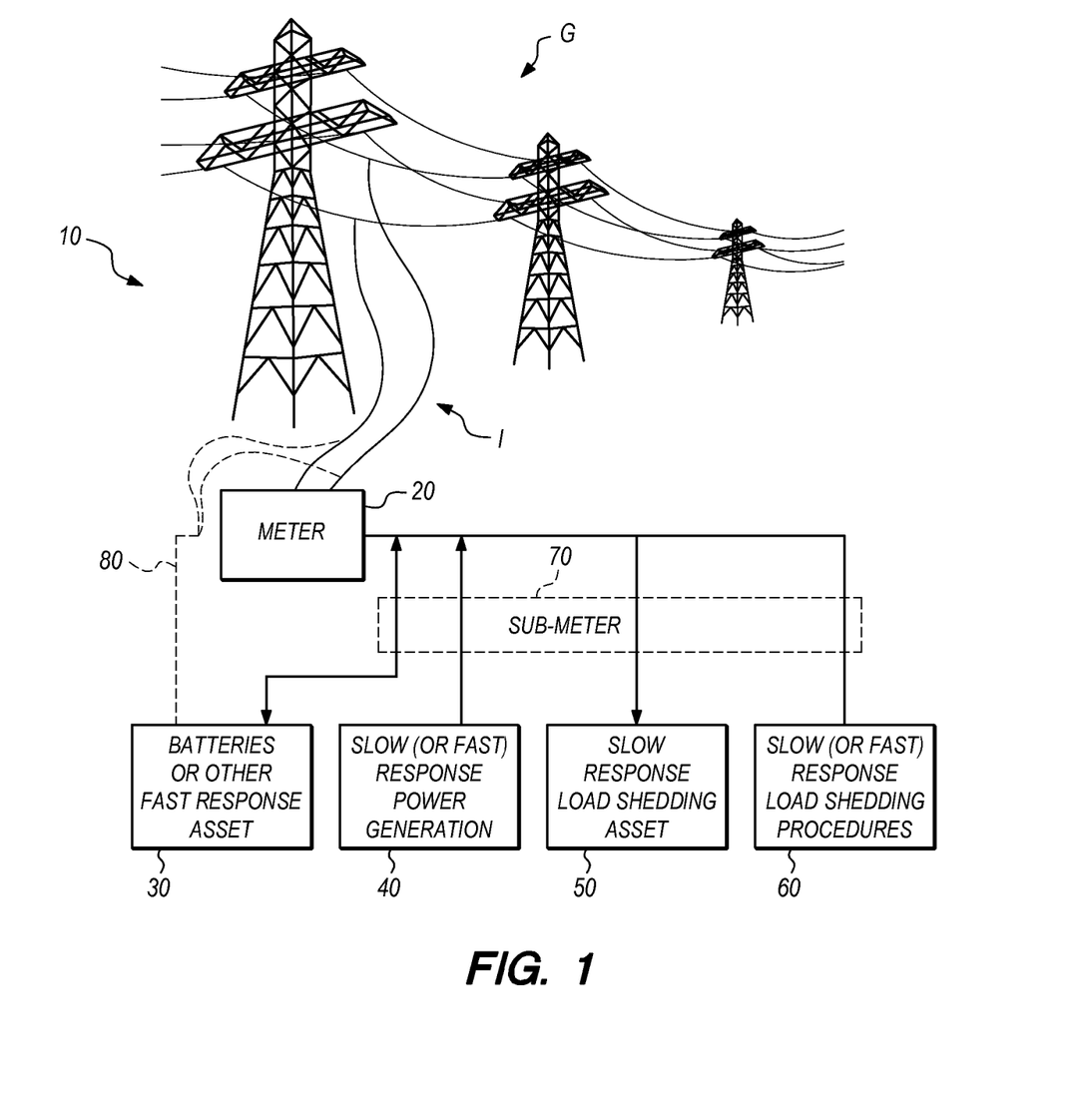
FIG. 1 is a schematic depicting how various different distributed energy resources can be coupled to the grid and paired with each other to facilitate the permanent monitoring and verification of this invention as well as pairing for fast response load shedding.

More specifically, and with particular reference to FIG. 1, details of a typical system 10 are described according to this invention. The system 10 includes various different resources/assets which each either use or supply (or both) electric power. The electric utility power supply system ("the grid") G is depicted as well as an interconnection I which provides for flow of electric power to (or from) the grid G. The system 10 is shown with a meter 20 between the interconnection I and the various different assets 30, 40, 50, 60.

The various assets are shown coupled to a single meter 20 before interconnection I to the grid G. Alternatively, multiple different meters 20 could be supplied, and conceivably one meter 20 for each asset 30, 40, 50, 60. It is also conceivable that various different subsets of assets 30, 40, 50, 60 could be coupled together directly or be coupled to a common sub-meter 70 before further connection through a primary meter 20 before interconnection I to the grid G. It is also conceivable that assets 30, 40, 50, 60 could be interconnected in a manner bypassing the meter 20.

Whether an asset utilizes electric power or supplies electric power is not particularly important in the operation of the system 10 and method of this invention. Rather, it is the ability of the asset to shed load or otherwise perform in a manner supporting the grid G and the ability of that asset to be dispatched, such as by a call from the operator of the grid G, to cause the asset to initiate a load shedding or electric power supplying operational state.

In particular, and considering various different types of assets, one type of asset might be a battery or set of batteries. When the electric utility is finding electric demand approaching electric power supply, the battery asset 30 can be dispatched to support the grid G and have the same effect as if a power drawing asset were dispatched to shed load. Similarly, electric power generators, such as backup diesel generators at a hospital, industrial facility, or other facility might be dispatched by an electric utility to support the grid. When dispatched, the power generating device would commence operation (or increase from a lower state of operation to a higher state of operation) to supply more electric power to the grid and have a similar effect to that of a power utilizing asset shedding load by drawing less power from the grid.

Such power generation equipment might have a variety of different response times between when first dispatched and when fully brought into a full performance state. For instance, a power generator might already be operating but at a lower level of power generation so that it merely needs to be throttled up and generate more power. Such a power generator might be considered to be relatively fast responding. In other instances, the power generating equipment might be in a completely off and cold state where it would require the operation of a startup routine on the order of many seconds or minutes to bring the power generation equipment up to full power. In still other instances, where power generating equipment involves a steam turbine, water must first be boiled into steam before the power plant can be brought online, and might take on the order of many minutes or even hours to come online Thus, power generation assets 40 might be considered slow response or fast response.

Some assets are typically utilizers of electric power rather than suppliers of electric power. Even battery assets 30 must undergo a charging cycle before they store energy which can be later discharged as a fast responding distributed energy asset. If a battery is in a charging cycle and so acting as an electric power utilizing asset, and the battery asset needs to be dispatched to support the grid G, its charging cycle can be terminated and provide the benefit of a fast responding load shedding asset by merely quickly transitioning from a charging state to a non-charging state.

Other slow response load shedding assets 50 could include equipment such as evaporative pre-coolers. Evaporative pre-coolers are known to enhance the performance of air conditioning systems. By dispatching an evaporative pre-cooler, the benefit of operating the evaporative pre-cooler to improve the efficiency of the air conditioning unit or refrigeration unit, and cause such an air conditioning or refrigeration unit to draw less power has the effect of shedding load. However, the benefit is not instantaneous. Rather, the benefit is provided over a time lag, such as that depicted in FIG. 2.

Other slow response low shedding assets 60 can be in the form of operational procedures. For instance, a building can have lighting in different stages including full lighting and various levels of partial lighting. The lighting system can be dispatched to transition from full lighting to partial lighting and act as a relatively fast response load shedding asset. Other relatively fast responding load shedding assets can include HVAC compressors which can be turned down or shut off with cool air supplied to a building or other space still being maintained for some period of time before the HVAC compressor needs to be turned on again to avoid excessive discomfort within the building or other air conditioned space. Turning down or turning off such HVAC compressors can be a relatively fast response load shedding asset.

Slow response load shedding asset procedures 60 might also include announcements over public address systems to workers at large facilities encouraging them to turn off electric power utilizing equipment that is not needed. A time lag would be involved before individuals would be able to respond by turning off such equipment. The performance of such a load shedding procedure 60 could be validated by making such requests under various different conditions and measuring the response achieved. Permanent monitoring can also be utilized to verify the actual response achieved in particular instances. Response times can also be recorded and used to predict future performance of the load shedding procedure 60.

Each distributed energy resource preferably first undergoes a validation procedure and also preferably has its performance permanently monitored on an ongoing basis, so that the benefits associated with dispatch of the distributed energy resource can be validated before dispatch and monitored during and after dispatch. A grid operator can thus monitor the grid and dispatch resources on a moment-by-moment basis to support proper grid function.

For validation, rather than relying on theoretical performance benefits such as load shedding capability when dispatched, actual power measurements are taken at regular intervals and recorded. Performance baselines can be developed such as maximum power draw, minimum power draw and other power utilizing and load shedding metrics. These baselines can be further sorted based on the day of the week, whether the day is a weekday, weekend and/or holiday, the ambient temperature of the air where the distributed energy resource is located, the time of day, the season of the year and perhaps other weather conditions such as degree of sunshine/cloudiness, humidity, etc.

The distributed energy resource is caused to have its load shedding benefit initiated by the distributed energy resource being dispatched at a time when the known other metrics are also being measured. The amount of load shedding and other performance metrics are measured and stored in a database along with all of the other metrics defining ambient conditions and other influences associated with the particular performance metrics which were measured. The distributed energy resource is then restored to its original state and this process can be repeated with other distributed energy resources. This validation procedure would typically be done at times when the grid is operating normally and does not have particular load shedding needs, but rather is performed for validation purposes. This validation could occur early in the service life of a distributed energy resource, or could be provided on an ongoing periodic basis to "re-certify" a distributed energy resource for dispatchable load shedding, or could be provided for one type of equipment and then provided as a form of "pre-certification" for identical equipment added to the grid later.

Figure 5:
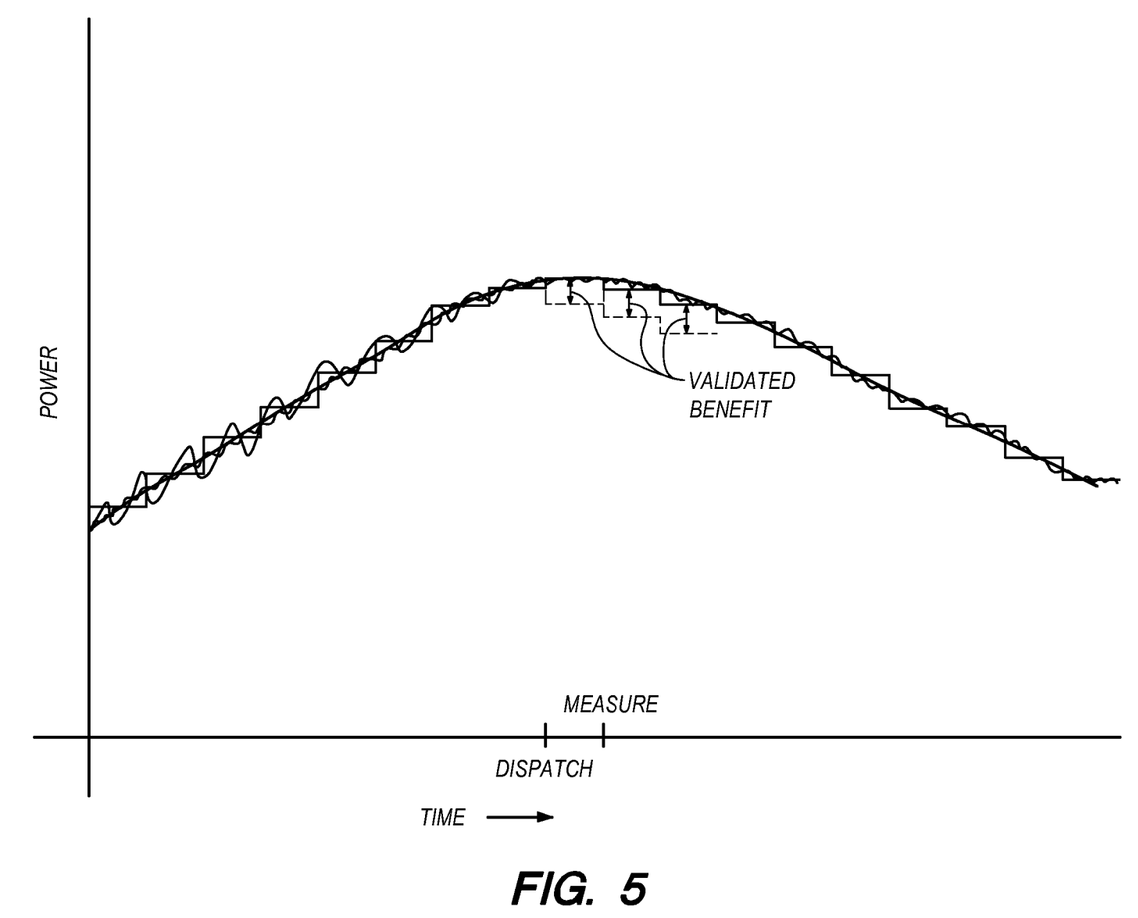
FIG. 5 is a graph of power versus time for an electric grid and showing how load shedding can be validated in one embodiment of the invention.

A particular example in one embodiment of such monitoring, validation, certification and recertification is described with regard to FIG. 5. FIG. 5 shows a power demand curve versus time which might be experienced by an individual power utilizing resource such as what would be measured by an individual sub-meter or might be a power meter output for a facility that has a variety of different power utilization equipment or power supplying equipment therein, with the meter showing the combination of all power utilization by the metered customer. The meter (FIG. 1) would be a form of meter provided within an advanced metering infrastructure in that it not only tracks total power over time (e.g. measured in kilowatt hours) over a billing cycle such as monthly, but also breaks the power utilization measurements into smaller subparts of time, such as in fifteen minute increments. The meter also has the capability of transmitting information from the meter to various individuals or systems including the owner of the power equipment measured by the meter, the electric utility and the grid operator. Third party validators could also have access to such information.

While power utilization can be quite variable, with a graph of such power utilization including spikes when high load equipment is turned on, and drops in the power utilization curve associated with turning off high power utilization equipment, this power utilization can be smoothed into a more general trend line which might be calculated and graphed in the form of a "moving average" of actual power. Only a very sensitive meter that supplies granular data in short time increments could show the actual power demand curve with all of the spikes and drops that it would typically include. These power spikes particularly illustrate why it is important for the grid operator to maintain some excess power within the grid so that these peaks in demand can be met for the utility's customers.

However, for purposes of monitoring and validation of dispatchable load shedding resources, the general trend in the power such as that represented by a moving average is sufficient. A meter that provides power utilization data broken into fifteen minute increments does not particularly show the spikes and drops in the power utilization curve. However, it can clearly demonstrate the load shedding capability of a dispatchable resource. In particular, the power trend curve provided by the meter would at a particular time during a day have established an actual power utilization curve. This actual power utilization trend curve often increases earlier in the day, peaks in the early to mid-afternoon and then drops thereafter, in a somewhat sinusoidal fashion for many electric power utilization customers. At an instant in the middle of the day the power utilization trend curve extends from earlier in the day to the instant in the middle of the day, when it is viewed and does not include the entire curve because that time has not yet come. However, from past experience and observation such as of the weather, one can predict with at least moderate accuracy how this power utilization trend curve will likely progress through the rest of the day.

To validate a dispatchable load shedding resource, the grid operator preferably waits until a fifteen minute packet of data from the meter is supplied. As soon as this data is received, the grid operator dispatches the resource. Fifteen minutes later the next packet of data from the meter is received from the grid operator in the form of a measurement of power utilization. If the power utilization trend line is approximately constant compared to the previous measurement when previously predicted, and the actual measurement of power utilization is seen to be lower than the predicted amount, this difference between the power actually measured and the power which was measured previously (and predicted to continue) establishes an amount of load that was shed by the dispatching of the resource.

For further validation, fifteen minutes later the next packet of data from the meter can be received by the grid operator and compared to other measurements. If this next measurement is similar to the previous measurement, it provides further validation that the dispatchable load shedding resource not only initially provided the desired load shedding, but that this load shedding is maintained at least over a period of a half hour. If the second measurement shows an even greater amount of load shedding, it indicates to the grid operator that the dispatchable load shedding resource provides an initial smaller amount of load shedding which then increases to a greater amount over time. If the second measurement shows a lesser amount of load shedding, this can be indicative of a dispatchable load shedding resource which initially provides a load shedding benefit to the grid, but that this benefit tapers off over time.

Further measurements in fifteen minute increments can be received from the grid operator to further characterize and validate the characteristics of the dispatchable load shedding resource. Once sufficient information has been gathered, the resource can be restored by having its dispatch order revoked and return to regular operation. The next measurement after canceling the dispatch order can also provide useful information to the grid operator as to how quickly the resource returns to expected typical performance and other characteristics such as perhaps spikes in load which occur when some dispatchable energy resources are restored after cancelation of a dispatch order.

Typically, a grid operator might have a large number of dispatchable load shedding resources and on days when the load is following highly predictable trend curves for the various different dispatchable load shedding resources or for the grid as a whole, the grid operator can select individual dispatchable load shedding resources for validation tests such as those described above. Such tests can act to periodically re-certify dispatchable load shedding resources. Information about the certification including the amount of load actually shed, how quickly the load shedding resource responded after being dispatched, and the dates of most recent certification or recertification can all be gathered in a database and utilized by a grid operating individual (or by algorithms programmed into a computer) so that when the grid is under stress and needs to shed load, the grid can be managed including dispatching load shedding resources in a manner which will actually function as expected. In this manner, the grid operator is not relying on theoretical load shedding performance alone, but rather is able to rely on certified and validated load shedding resources with a high degree of confidence that the desired load shedding benefits will actually be achieved.

Load shedding performance can be graphed so that load shedding curves are provided for each distributed energy resource. Beneficially other performance metrics are also measured such as annual kilowatt hour impacts of the distributed energy resource, ambient conditions broken down into small temperature intervals such as down to the level of 2° F. and with time of day broken down to performance for each particular hour of the day. The difference between load when dispatched and load when not dispatched can also be measured. Data from other sources can also be utilized such as "Typical Meteorological Year" data for a closest weather station to the dispatchable energy resource, such as to design validation protocols for the distributed energy resource and to facilitate interpretation of the measured data.

In one embodiment expected total annual energy savings associated with the distributed energy resource can be tabulated by utilizing Typical Meteorological Year data versus the validated performance criteria for the distributed energy resource. The difference between the load shedding and/or power utilized by the distributed energy resource during validation can be compared to ambient conditions in the Typical Meteorological Year so that the overall annual energy savings can be calculated.

In a similar manner, peak kilowatt load shedding or power output can also be measured based on different ambient conditions for validation and ongoing monitoring. For peak kilowatt impact, the hours of greatest power utilization in the day are focused upon and evaluated utilizing Typical Meteorological Year data for weather stations near the distributed energy resource to evaluate peak kilowatt impact on load shedding and/or power utilization. The peak kilowatt impact can be provided in an averaged manner or in a projected manner, with peak kilowatt impacts for projected impact on the grid utilizing data associated with weather extremes rather than weather averages.

Nearly every electric power utilizing asset can to some extent be characterized as an asset which can potentially shed load either by being turned off (or turned down) if it is an electric power utilizing device or being turned on or taken to a higher state of operation if it is an electric power generating device. Each such asset will tend to have a different response time which can also be measured and quantified, such as by graphing versus time the load shedding provided by various different types of assets. A non-limiting example of such other assets include capacitors, fly wheels, blowers, chillers, pumps and aerators at waste water plants, and nearly all other types of electric power utilizing or generating equipment.

Figure 2:
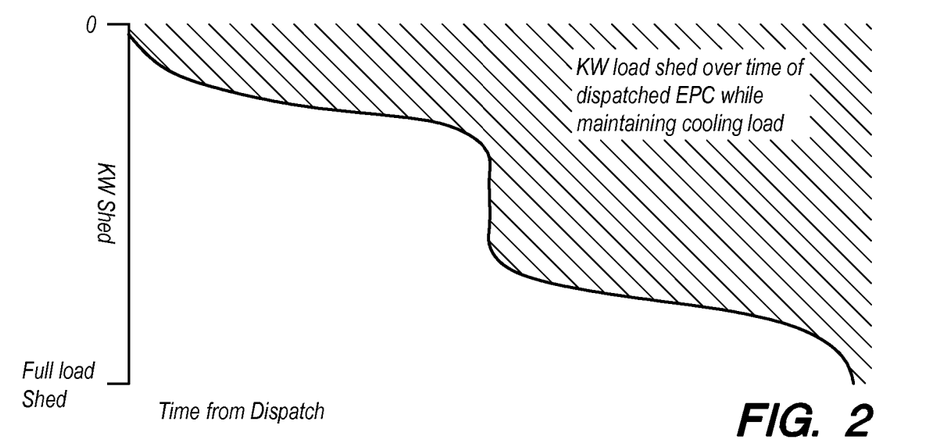
FIG. 2 is a graph of load shedding over time for a slow responding distributed energy resource such as an evaporative pre-cooler.
Figure 3:
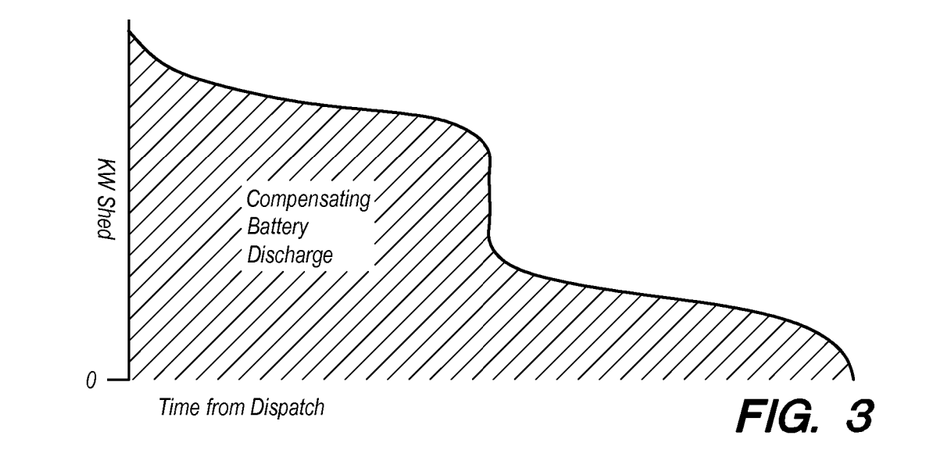
FIG. 3 is a graph of load shedding over time for a fast responding distributed energy resource when the fast responding distributed energy resource, such as a battery, is variably dispatched to compensate for slow response of a slow responding distributed energy resource, such as the evaporative pre-cooler of FIG. 2.
Figure 4:
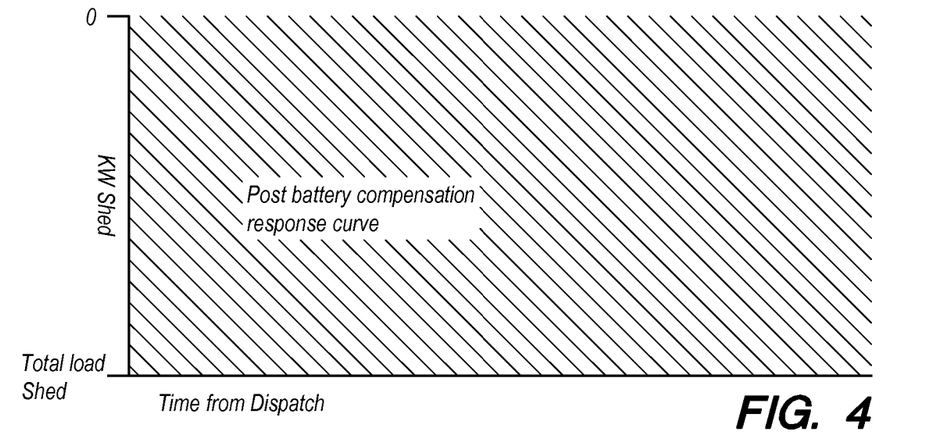
FIG. 4 is a graph of the resulting load shed provided by dispatching the fast responding distributed energy resource and slow responding distributed energy resource together, such as the batteries of FIG. 3 and the evaporative pre-cooler of FIG. 2.

With particular reference to FIGS. 2-4, it is beneficial for electric grid operators to be able to dispatch fast responding load shedding assets. However, some load shedding assets which provide a very large amount of load shedding are slow in response. Thus, while the magnitude of load shedding is highly desirable, the slow response is undesirable. An electric grid operator thus has to make a choice between two suboptimal options. Either achieve fast response at a high cost or slow response at a low cost. A similar suboptimal choice is to select between either achieving fast response but only of a relatively small magnitude of load shedding response, or achieving a large magnitude load shedding response, but relatively slowly. These types of compromises could make the various different distributed energy resources less than optimal for dispatch.

When purchasing equipment that utilizes electric power, one aspect of such purchase is the degree to which the asset might generate revenue directly or minimize operational expense because it is suitable for being a dispatchable distributed energy resource. If a distributed energy resource is of a dispatchable variety, various different benefits are available to the operator of the asset. These benefits might be in the form of financial payments made to the owner of the distributed energy resource each time the distributed energy resource is dispatched for load shedding. The owner/operator of the distributed energy resource might also receive financial compensation for merely making the distributed energy resource available for dispatching, even if it is never actually dispatched. Generally, the more valuable the distributed energy resource is to the grid operator, the more potential value is presented to the owner/operator of the distributed energy resource.

Assets typically of greatest value are those which can shed a large amount of load and which are fast in response. If a grid operator has choices to make as to which distributed energy resource to dispatch, in many instances the grid operator will be most interested in dispatching the large fast responding load shedding asset. Other factors which might influence the desirability of a distributed energy resource include the degree to which the distributed energy resource can be dispatched without or with minimal impact on the environment. For instance, pollution emitting combustion based power generation systems are less likely to be dispatched in many circumstances than non-polluting and/or renewable energy distributed energy resources.

With this invention, fast responding distributed energy resources can be paired with slow responding distributed energy resources to provide the benefit of a large load shedding and fast response distributed energy resource without requiring the expense of a large fast responding distributed energy resource, such as a large battery bank. In particular, a large but slow responding distributed energy resource, such as an evaporative pre-cooler, has its response curve quantified. FIG. 2 is an example of a typical load shedding curve for an evaporative pre-cooler. The evaporative pre-cooler provides a large amount of load shedding, but only after a transient period has elapsed. During the transient period a smaller amount of load shedding is occurring. It is even conceivable that during initial dispatch of an evaporative pre-cooler some load demand might be incurred, such as to power up systems, bring pumps into an operational state, etc. For instance, the evaporative pre-cooler may start out by drawing additional load and then begin to shed a small amount of load, and only after passage of this transient period does it reach its full load shedding potential.

By pairing this slow responding distributed energy resource with a fast responding distributed energy resource, such as a battery or set of batteries, the slow responding distributed energy resource is effectively converted into a fast responding distributed energy resource. In particular, when the slow responding distributed energy resource is first dispatched, the fast responding distributed energy resource is simultaneously also dispatched. Initially, little load shed is provided by the slow responding distributed energy resource (or possibly even load increase). Thus, the batteries supply a large amount of load shedding benefit by supplying electric power to the grid in a quantity similar to the gap between a current load shedding of the slow response distributed energy resource and the ultimate load shedding response achieved by the slow responding distributed energy resource.

As time progresses and the slow responding distributed energy resource sheds more load, the fast responding distributed energy resource, such as the battery, is varied in the amount of electric power supplied so that the net load shedding provided by the combination of the slow responding distributed energy resource and the fast responding distributed energy resource equals the ultimate load shedding capability of the slow responding distributed energy resource. After the transient period has passed, the fast responding distributed energy resource can be turned off and all of the load shedding is provided by the slow responding distributed energy resource.

If the full benefit were provided by the fast responding distributed energy resource, a significantly larger amount of batteries would be required, at greater initial capital expense, and also encountering the additional operational expenses. However, by pairing as described above, the grid operator has the full benefit as far as load shedding and grid G support that would be provided if the entire distributed energy resource were a fast responding distributed energy resource. A grid operator might be willing to pay a premium for fast responding load shedding assets. By pairing the fast responding load shedding asset with a slow responding load shedding asset, as depicted in FIGS. 2-4, the premium associated with providing a fast responding distributed energy resource is provided along with the high capacity for load shedding which is facilitated by the slow responding distributed energy resource, without encountering the expense of a large bank of batteries or other large expense of a large fast responding distributed energy resource.

With particular reference to FIG. 1, the fast responding and slow responding distributed energy resources 30, 40, 50, 60 could be paired together by the owner/operator of the system 10, such as by pairing of a battery asset 30 with a slow responding load shedding asset 50 within a sub-meter 70. As another alternative, the load shedding resources could be located at a very different part of the grid G, and even potentially owned by different owners/operators of the resources, but be dispatched in a manner similar to that provided by an owner/operator providing both the fast responding and slow responding distributed energy resources from a common location and at a common interconnection point I to the grid G. In the same manner that a slow response load shedding asset 50 can be coupled with batteries 30 or other fast response assets, the fast responding distributed energy asset 30 can be paired with slow response power generation 40 to provide the benefit of a fast responding power generating asset.

This disclosure is provided to reveal a preferred embodiment of the invention and a best mode for practicing the invention. Having thus described the invention in this way, it should be apparent that various different modifications can be made to the preferred embodiment without departing from the scope and spirit of this disclosure. When structures are identified as a means to perform a function, the identification is intended to include all structures which can perform the function specified.

What is claimed is:

1. A method for supporting electric utility performance with dispatchable distributed energy resources, including the steps of:
    identifying a plurality of dispatchable distributed energy resources, the dispatchable distributed energy resources each receiving or supplying power with a common electric utility power supply system in a common electric utility service area;
    coupling the dispatchable distributed energy resources to the electric utility in a manner providing ongoing monitoring of dispatchable distributed energy resource performance;
    dispatching at least one of the dispatchable distributed energy resources when needed for electric utility support;
    monitoring distributed energy resource performance after said dispatching step; and
    evaluating at least one of the dispatchable distributed energy resources before said dispatching step to determine an expected benefit to be provided to the electric utility when the dispatchable distributed energy resource is dispatched; and
    wherein said evaluating step includes the steps of first sensing electric utility performance, second sensing real-world conditions at the time of the evaluation, at least one of the conditions including ambient temperature at at least a portion of the electric utility service area, third dispatching an identified dispatchable distributed energy resource, fourth evaluating electric utility performance after the identified dispatchable distributed energy resource has been dispatched, fifth comparing electric utility performance before said identified dispatchable distributed energy resource is dispatched and after the identified dispatchable distributed energy resource is dispatched to identify an anticipated impact that the identified dispatchable distributed energy resource will have upon the electric utility when dispatched, sixth storing the results of this comparison in a database along with an identity of the identified dispatchable distributed energy resource being dispatched and at least one of the sensed real-world conditions present at the time of the evaluation.

2. The method of claim 1 wherein said dispatchable distributed energy resources include at least one slow responding dispatchable distributed energy resource and at least one fast responding dispatchable distributed energy resource,
    the at least one slow responding dispatchable distributed energy resource operatively coupled to a dispatchable use evaporative pre-cooler that when used serves to reduce the electrical load required to operate the slow responding dispatchable distributed energy resource;
    the at least one slow responding dispatchable distributed energy resource paired with the at least one fast responding dispatchable distributed energy resource,
    at least partially dispatching the fast responding dispatchable distributed energy resource substantially simultaneously with the evaporative pre-cooler so that electric utility grid support provided by the combination of the slow responding dispatchable distributed energy resource coupled to the dispatched evaporative pre-cooler and the fast responding dispatchable distributed energy resource at least partially mimics that of a fast responding dispatchable distributed energy resource for the period during which the evaporative pre-cooler is dispatched.

3. The method of claim 1 wherein the dispatched identified dispatchable distributed energy resources include at least one slow responding dispatchable distributed energy resource and at least one fast responding dispatchable distributed energy resource; and
    wherein dispatch includes altered operation of at least one coupled secondary resource at the at least one slow responding dispatched distributed energy resource.

4. The method of claim 3 wherein the altered operation of said at least one coupled secondary resource changes the efficiency of the at least one dispatched slow responding dispatchable distributed energy resource.

5. A system for supporting electric utility grid performance in an electric utility service area using multiple dispatchable distributed energy resources (DDRs), comprising in combination:
    a plurality of DDRs comprising at least one slow responding DDR and at least one fast responding DDR connected to the electric utility grid in the electric utility service area in a manner drawing or supplying power with the electric utility grid, each DDR dispatchable in a manner causing load to be added or shed in support of the electric utility grid;
    a dispatch controller interposed between each DDR and an electric utility grid operator, providing the electric utility grid operator with the ability to dispatch the DDR when desired; and a system for charting in a database electric utility grid support provided when each DDR is dispatched wherein said charting also includes recording in the database a variable real world condition that affects the performance of the DDR at at least a portion the electric utility area at the time of dispatch and also recording the performance of the dispatched DDR at that real world condition when dispatched.

6. The system of claim 5 wherein said charting records in the database the electric utility grid support provided by each dispatched DDR over a series of sequential periods of time both before and after dispatch.

7. The system of claim 6 wherein dispatch includes altered operation of at least one coupled secondary resource at the at least one slow responding DDR.

8. The system of claim 7 wherein said at least one coupled secondary resource changes the efficiency of the at least one slow responding DDR.

9. A method for supporting electric utility grid performance, including the steps of:
providing a slow responding dispatchable distributed energy resource coupled to the grid, the at least one slow responding dispatchable distributed energy resource operatively coupled to a dispatchable use evaporative pre-cooler that when used serves to reduce the electrical load required to operate the slow responding dispatchable distributed energy resource;
providing a fast responding dispatchable distributed energy resource coupled to the grid;
at least partially dispatching the fast responding dispatchable distributed energy resource substantially simultaneously with the evaporative pre-cooler so that electric utility grid support provided by the combination of the slow responding dispatchable distributed energy resource coupled to the dispatched evaporative pre-cooler and the fast responding dispatchable distributed energy resource at least partially mimics that of a fast responding dispatchable distributed energy resource for the period during which the evaporative pre-cooler is dispatched.

10. The method of claim 9 including the further steps of varying an amount of dispatch of the fast responding dispatchable distributed energy resource with a greater amount of load shedding when the slow responding dispatchable distributed energy resource has a lesser amount of load shedding and with the fast responding dispatchable distributed energy resource dispatched to a lesser amount when the slow responding dispatchable distributed energy resource is providing a greater amount of load shedding.

11. The method of claim 10 including the further steps of preprogramming the fast responding dispatchable distributed energy resource to be dispatched a particular amount over time which compensates for the slow response of the slow responding dispatchable distributed energy resource so that the combined dispatching of the slow responding dispatchable distributed energy resource and the fast responding dispatchable distributed energy resource at least partially mimics the load shedding of a single larger fast responding dispatchable distributed energy resource.

12. The method of claim 2, wherein when the evaporative pre-cooler is dispatched the efficiency of the slow responding energy resource improves and the slow responding dispatchable distributed energy resource can shed load to the grid without substantially reducing the operating capacity of the slow responding dispatchable distributed energy resource.

13. The method of claim 12 wherein the efficiency improvement of the slow responding dispatchable distributed energy resource is provided over a time lag after the dispatch of the evaporative pre-cooler.

14. The method of claim 13 wherein the efficiency improvement of the slow responding dispatchable distributed energy resource changes over time after the dispatch of the evaporative pre-cooler until a substantially steady state of slow responding dispatchable distributed energy resource efficiency is reached.

15. The method of claim 12 including the further steps of varying an amount of dispatch of the fast responding dispatchable distributed energy resource with a greater amount of load shedding when the slow responding dispatchable distributed energy resource has a lesser amount of load shedding and with the fast responding dispatchable distributed energy resource dispatched to a lesser amount when the slow responding dispatchable distributed energy resource is providing a greater amount of load shedding.

16. The method of claim 2 including the further steps of preprogramming the fast responding dispatchable distributed energy resource to be dispatched a particular amount over time which compensates for the slow response of the slow responding dispatchable distributed energy resource so that the combined dispatching of the slow responding dispatchable distributed energy resource and the fast responding dispatchable distributed energy resource at least partially mimics the load shedding of a single larger fast responding dispatchable distributed energy resource.

17. The method of claim 9, wherein when the evaporative pre-cooler is dispatched the efficiency of the slow responding dispatchable distributed energy resource improves and the slow responding dispatchable distributed energy resource can shed load to the grid without substantially reducing the operating capacity of the slow responding dispatchable distributed energy resource.

18. The method of claim 17 wherein the efficiency improvement of the slow responding dispatchable distributed energy resource is provided over a time lag after the dispatch of the evaporative pre-cooler.

19. The method of claim 18 wherein the efficiency improvement of the slow responding dispatchable distributed energy resource increases over time after the dispatch of the evaporative pre-cooler until a substantially steady state of slow responding dispatchable distributed energy resource efficiency is reached.

20. The method of claim 1, further including during said evaluating step recording the ambient temperature at the proximate location of the identified dispatchable distributed energy resource.

21. The method of claim 1, further including during said evaluating step recording the ambient relative humidity at the proximate location of the identified dispatchable distributed energy resource.

22. The method of claim 2, further including during said evaluating step recording the ambient temperature at the proximate location of the identified dispatchable distributed energy resource.

23. The method of claim 2, further including during said evaluating step recording the ambient relative humidity at the proximate location of the identified dispatchable distributed energy resource.

* * * * *